US012614918B2

(12) United States Patent
Etter et al.

(10) Patent No.: US 12,614,918 B2
(45) Date of Patent: Apr. 28, 2026

(54) ELECTRICAL SUBMERSIBLE PUMPING SYSTEM WITH A RIDE THROUGH POWER SUPPLY HAVING A SAFETY INTERLOCK

(71) Applicant: Baker Hughes Oilfield Operations LLC, Houston, TX (US)

(72) Inventors: Nathan Etter, Tulsa, OK (US); Gary Williams, Broken Arrow, OK (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 18/596,405

(22) Filed: Mar. 5, 2024

(65) Prior Publication Data

US 2025/0286402 A1 Sep. 11, 2025

(51) Int. Cl.
| | |
|---|---|
| *E21B 43/12* | (2006.01) |
| *H02J 3/388* | (2026.01) |
| *H02J 7/00* | (2006.01) |
| *H02J 9/06* | (2006.01) |

(52) U.S. Cl.
CPC .............. *H02J 9/06* (2013.01); *E21B 43/128* (2013.01); *H02J 3/388* (2020.01); *H02J 7/0024* (2013.01)

(58) Field of Classification Search
CPC ............ H02J 9/06; H02J 3/388; E21B 43/128
See application file for complete search history.

(56) References Cited

U.S. PATENT DOCUMENTS

| | | |
|---|---|---|
| 4,741,405 A | 5/1988 | Moeny et al. |
| 11,451,170 B2 | 9/2022 | Williams et al. |

| | | | |
|---|---|---|---|
| 11,710,866 B2 | 7/2023 | Eberhard et al. | |
| 2016/0049892 A1 | 2/2016 | Moghadas et al. | |
| 2016/0053587 A1 | 2/2016 | Eriksen | |
| 2019/0373677 A1 | 12/2019 | Perera | |
| 2023/0417247 A1* | 12/2023 | Mitchell | ............. F04D 15/0066 |

FOREIGN PATENT DOCUMENTS

| | | | |
|---|---|---|---|
| CN | 203937521 U | 11/2014 | |
| CN | 210403824 U | 4/2020 | |
| CN | 217063355 U | 7/2022 | |
| EP | 3722553 A1 * | 10/2020 | ............. E21B 34/16 |

OTHER PUBLICATIONS

International Search Report and Written Opinion for International Application No. PCT/US2025/018439 (063467); report mail date Jun. 18, 2025; pp. 1-11.

* cited by examiner

*Primary Examiner* — Daniel Cavallari
(74) *Attorney, Agent, or Firm* — Bracewell LLP; Keith R. Derrington

(57) ABSTRACT

A well system includes an electrical submersible pumping ("ESP") assembly, a variable speed drive, and a ride through system. The ESP assembly includes a pump for lifting liquid from inside the well and an electric motor for powering the pump. The variable speed drive is outside the well and controls delivery of electricity from a power source to the motor. The ride through system provides backup electricity if there is an interruption of electricity from the power source. The ride through system includes a bank of power modules having stored electrical power. The modules are connected in series and have a combined electrical potential adequate for powering the motor. By selectively disconnecting adjacent modules from one another, the electrical potential from the bank of power modules is reduced to a magnitude that is not hazardous for personnel.

10 Claims, 3 Drawing Sheets

ELECTRICAL SUBMERSIBLE PUMPING SYSTEM WITH A RIDE THROUGH POWER SUPPLY HAVING A SAFETY INTERLOCK

BACKGROUND OF THE INVENTION

1. Field of Invention

The present disclosure relates to an electrical submersible pumping system with a ride through power supply having a safety interlock.

2. Description of Prior Art

Electrical submersible pumping systems ("ESP systems") are commonly used in hydrocarbon producing wells. Typically, ESP systems include an electrical motor, a pump having impellers and diffusers (which is usually an electrical submersible pump ("ESP")), and a driveshaft connected between the motor and pump. The driveshaft is attached to the impellers, and the shaft and impellers rotate when the motor is energized. Rotating impellers draws fluid from inside the well into the pump and forces the fluid through the diffusers, which pressurizes the fluid for delivery to surface. When electrical power to the motor is lost at the same time a column of well fluid is above the impellers, fluid in the column is gravity driven downhole and across the impellers. The backflow often soon causes the impellers to rotate in a direction opposite their rotation during pressurization. The connected driveshaft also rotates to backspin the motor which generates electricity that is conducted up the well along a power cable connected from surface to the motor. This electricity creates undesired effects, such as posing a hazard for personnel operating the well. An additional undesired effect from backspin is motor damage, which can occur if the motor is reenergized during backspin.

As a corrective measure to address potential power loses, ride through or power through systems are sometimes installed in ESP systems, which temporarily supply electrical power to an ESP system during intermittent short term power outages. Typical ride through systems include a bank of batteries or super capacitors arranged in series to provide a voltage output necessary for short term electrical power supply for an ESP system. Examples of ride through (or power through) systems or methods are disclosed in U.S. Pat. Nos. 7,607,896, 8,092,190, and 11,451,170, which are assigned to the assignee of the present application and incorporated by reference herein in their entireties and for all purposes. Ride through systems are designed for driving an ESP motor, which results in the electrical potential stored in a ride through system be at a magnitude hazardous to operations personnel. Which introduces difficulties to maintenance personnel, such as the need to don personnel protective gear or drain the electricity from the ride through system, both of which are time consuming efforts that result in losses of revenue.

SUMMARY OF THE INVENTION

Disclosed herein is an example method of handling a ride through system for use with an electrical submersible pump ("ESP") assembly, which includes disconnecting from one another a bank of power modules in the ride through system that are connected in series to reduce the electrical potential transmittable from the ride through system to lower than a lower threshold magnitude that is hazardous to personnel, and reconnecting the modules so that the electrical potential transmittable from the ride through system is at least at a higher threshold magnitude for powering the ESP assembly to oppose backspin. In an example, the bank of power modules are in a deactivated mode when sequential modules are disconnected from one another, and are in a standby mode when sequential modules are connected to one another. The modules are optionally serviced when the bank of power modules are in the deactivated mode. In an alternative, the step of disconnecting the sequential modules includes opening an electrical connection between the adjacent modules, which in one example, opening an electrical connection involves moving a switch into an open position, where the switch is in a line that selectively conducts electricity between the sequential modules. In an embodiment, each sequential power module is in selective electrical communication by electrical connections that connect between the sequential power modules, and where the sequential modules are disconnected from one another at substantially the same time. In this example, an interlock is optionally coupled with each of the electrical connections and the method further includes activating the interlock to selectively connect and disconnect the sequential power modules. The ESP assembly is optionally selectively powered with electricity from a power source, and the modules are in selective electrical communication with the ESP assembly when electricity from the power source is suspended. Examples of the method include recharging the power modules.

Also disclosed is an example of a ride through system for use with an electrical submersible pump ("ESP") assembly, which includes, power modules that each have a maximum electrical potential below a threshold magnitude that is hazardous to personnel and that selectively have a combined electrical potential which is at least at a threshold magnitude for powering the ESP by an amount that opposes backspin, and electrical connections between sequential power modules to define a bank of power modules that are arranged in series, the electrical connections selectively in a standby configuration so that a maximum electrical potential transmissible from the bank of power modules is substantially equal to a sum of the electrical potentials of each of the power modules, and the electrical connections selectively changeable into a deactivated mode in which the maximum electrical potential transmissible from the bank of power modules is substantially equal to an electrical potential of a one of the power modules. The ride through system optionally includes switches in the connections that are each in an open position when the electrical connections are in the deactivated mode and that are each in a closed position when the electrical connections are in the standby mode. In examples, an interlock is coupled to the switches, that selectively moves the switches between the open and closed positions. A controller is optionally included for monitoring electricity from an electrical source to the ESP assembly, and the interlock is in communication with the controller and is responsive to commands from the controller. Examples of power modules include a battery, a capacitor, a super capacitor, and combinations of these. Embodiments exist having one or more of, a variable speed drive for controlling electricity to the ESP assembly and that is in selective electrical communication with the bank of power modules, and a recharging power source for recharging the power modules. Optionally, the recharging power source is the same as a power source for providing electrical power to the ESP assembly. Example magnitudes of electrical potential in each of the power modules are at values that are substantially equal to one another, values that are different from one another, values that are substantially the same as others and different from others, and combinations.

BRIEF DESCRIPTION OF DRAWINGS

Some of the features and benefits of the present invention having been stated, others will become apparent as the description proceeds when taken in conjunction with the accompanying drawings, in which.

Figure 1:
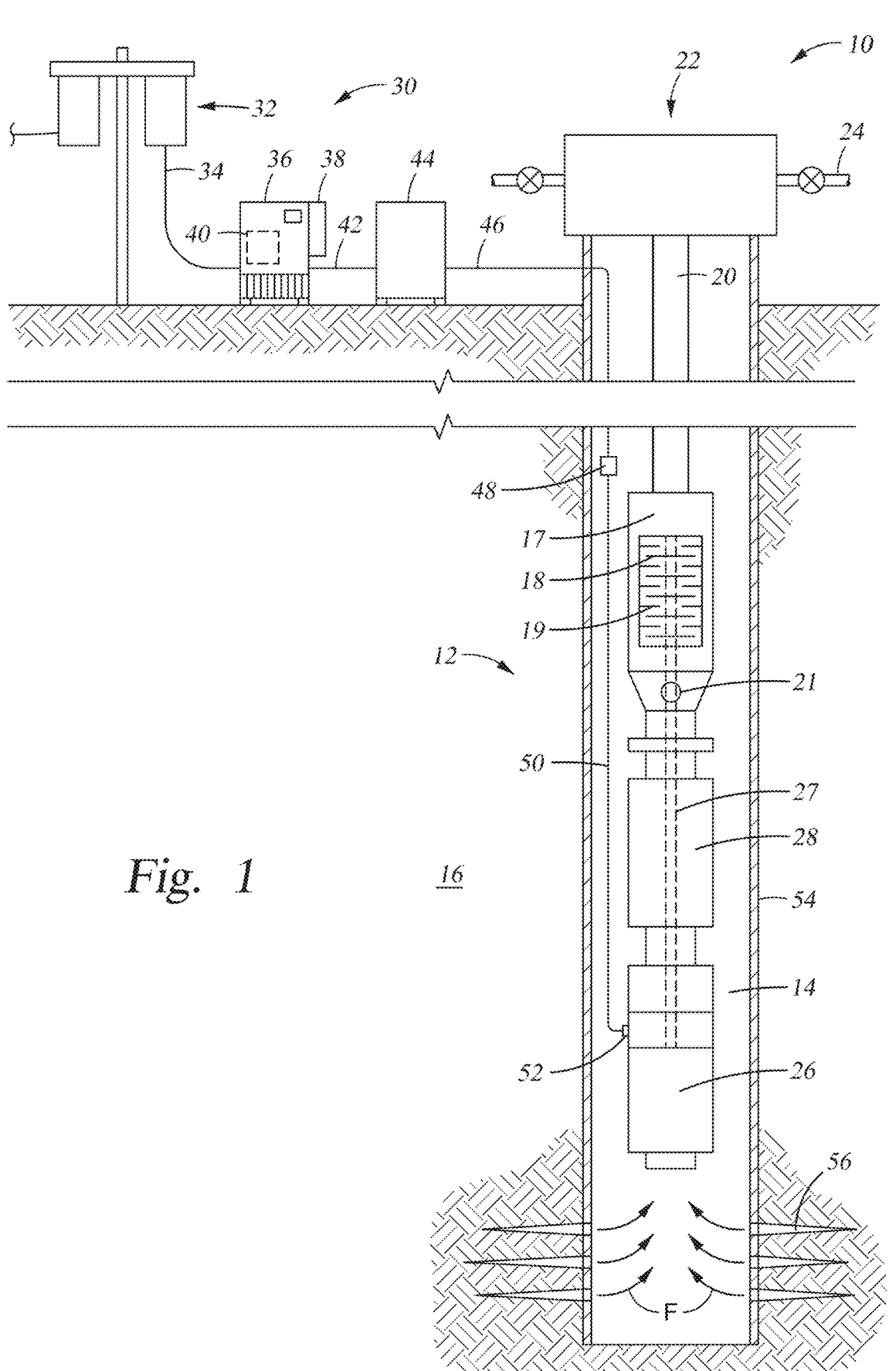
FIG. 1 is a side partial sectional view of an example of a well system that includes an electrical submersible pumping system and a variable speed drive.

While subject matter is described in connection with embodiments disclosed herein, it will be understood that the scope of the present disclosure is not limited to any particular embodiment. On the contrary, it is intended to cover all alternatives, modifications, and equivalents thereof.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of a cited magnitude. In an embodiment, the term "substantially" includes +/−5% of a cited magnitude, comparison, or description. In an embodiment, usage of the term "generally" includes +/−10% of a cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

In FIG. 1 is a side partial sectional view of an example of a well system 10 that includes an electrical submersible pumping ("ESP") assembly 12 for artificially lifting liquid from within a well 14, which intersects a formation 16. ESP assembly 12 includes a pump 17 having impellers 18 and diffusers 19 stacked alternatingly between the impellers 18. Rotating impellers 18 within the stationary diffusers 19 lifts liquid from within the well 14 upwards through production tubing 20 to surface. An inlet 21 is formed through a sidewall of the housing of pump 17, which provides a path for the liquid to enter into pump 17 and into contact with the impellers 18 and diffusers 19. The upper end of production tubing 20 terminates within a wellhead assembly 22 shown on surface. Inside wellhead assembly 22 liquid in production tubing 20 is transferred into a production line 24 shown extending laterally from wellhead assembly 22. In alternatives, production line 24 transports fluid distally from wellsite. ESP assembly 12 also includes an electrical motor 26, a connected shaft 27 shown in dashed outline having an end rotationally affixed to motor 26, and an opposing end coupled with the impellers 18. A seal section 28 for equalizing pressure within motor 26 is included with assembly 12, which is shown between motor 26 and pump 17 and intersected by shaft 27.

Well system 10 includes an electrical supply system 30 for is providing electricity to the motor 26. For the purposes of discussion herein, in an example electricity means a flow of electrons and measurable in terms of electrical current, and having a potential energy measurable in terms of voltage. Supply system 30 includes a power source 32, which in examples includes alternating current and optionally provides three-phase power for driving motor 26. Examples of power source 32 include an electrical utility, a generator, and a renewable source. In the example of FIG. 1, line 34 connects power source 32 to a motor controller 36, such as a variable speed drive or other similar device. Examples of variable speed drive 36 include a pulse with modulated variable frequency drive, or other known controllers for varying current or voltage within the electricity being delivered from power source 32 which is used for varying the rotational speed of motor 26. In the example shown, power source 32 and variable speed drive 36 are on surface and outside of wellbore 14. A controller 38 is shown included with variable speed drive 36 and which in examples monitors characteristics of the electricity provided from power source 32 and includes means for adjusting operation of variable speed drive 36 in response to changes in characteristics of the electricity provided through power source 32. Shown in dashed outline within variable speed drive 36 is a ride-through system 40, which as explained in more detail below, includes stored electrical energy for providing power to motor 26 in instances when electricity from power source 32 is temporarily suspended or otherwise unavailable. A line 42 is shown electrically connecting variable speed drive 36 to a transformer 44. A power cable 46 extends from an output of transformer 46, through wellhead assembly 22 and into wellbore 14. An end of power cable 46 opposite transformer 44 connects to a splice 48, which provides connection to a motor lead extension 50 (which is optionally part of the power cable 46). Motor lead extension 50 terminates at a pothead connector 52 shown mounted onto motor 26 and provides electrical connection from the motor lead extension 50 to the motor 26. Further shown in FIG. 1 is that wellbore 14 is lined with casing 54, perforations 56 extend radially through the sidewalls of casing 54 that permit the flow of fluid F from within formation 16 and to within inside of casing 54.

Figure 2A:
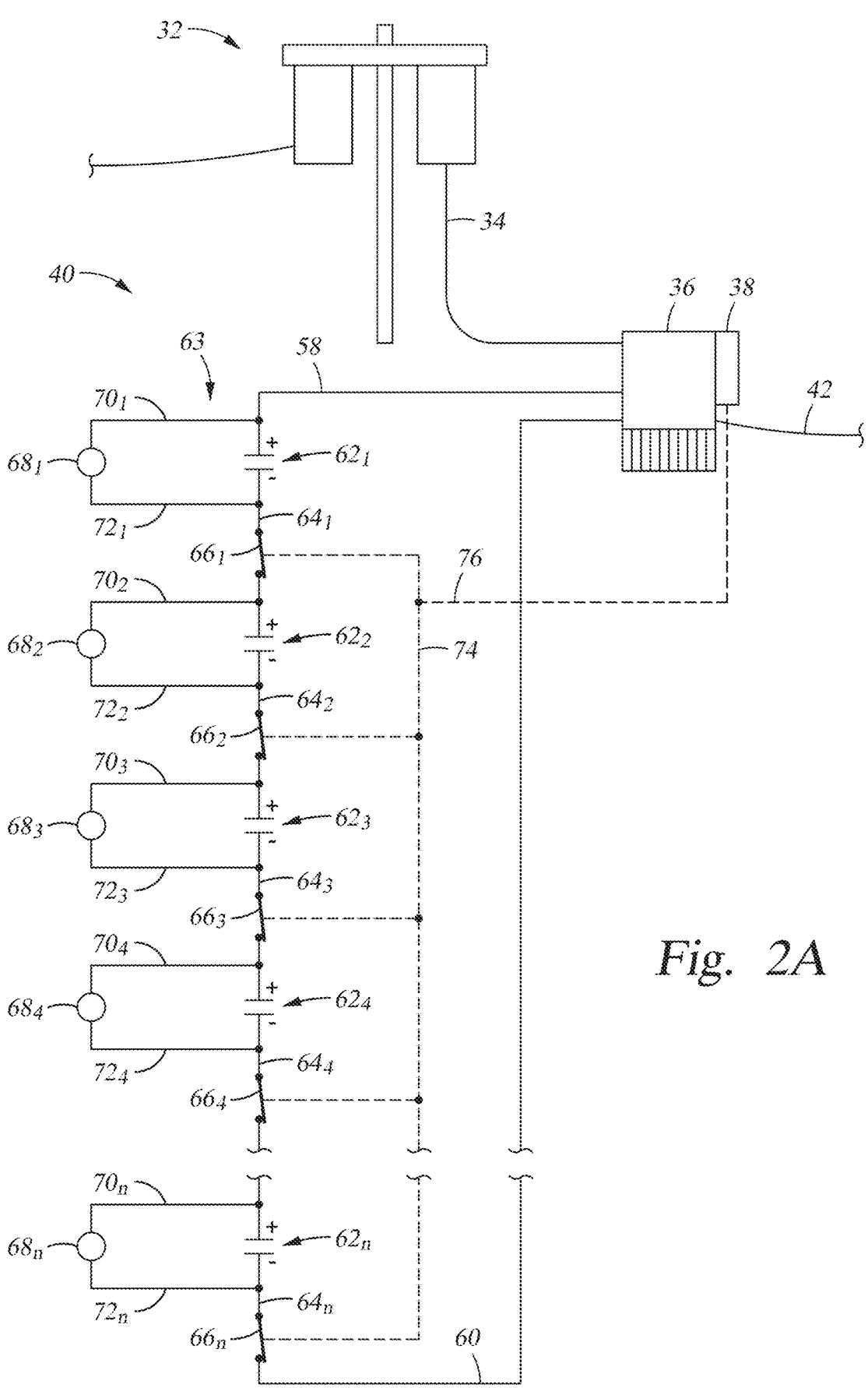
FIG. 2A is a schematic example of a ride through system for use with the variable speed drive of FIG. 1, the ride through system being in a standby mode.

Shown in FIG. 2A is a schematic example of ride-through system 40. Electrically conducting leads 58, 60 are on opposing ends of ride-through system 40, and provide electrical communication between ride-through system 40 and variable speed drive 36. The ride-through system 40 of FIG. 2A includes power modules $62_{1-n}$. Examples of the power modules $62_{1-n}$ include batteries, capacitors, super capacitors, or any device capable of retaining a designated amount of stored electrical energy for a particular period of time. The modules $62_{1-n}$ each have a positive lead (+) and a negative lead (−), and during the particular period of time when the electrical energy is stored in the modules $62_{1-n}$, an electrical potential exists between the positive and negative leads. In a non-limiting example, the electrical energy stored in the modules $62_{1-n}$, which is alternatively referred to as power capacity and is expressed in terms of Watt-hours. In the illustrated embodiment the modules $62_{1-n}$ are arranged in series so that the electrical potential difference between lead 58 and lead 60 is substantially equal to the combined electrical potentials across each one of the modules $62_{1-n}$ (i.e., across their respective positive and negative leads), and which defines the electrical potential of the ride-through system 40. Further illustrated in FIG. 2A is that a bank of modules 63 is defined by the power modules $62_{1-n}$ connected in series. In alternatives (not shown), the power modules $62_{1-n}$ are arranged in a combination of parallel and series configurations.

Connector lines $64_{1-n}$ extend between sequential ones of the power modules $62_{1-n}$ and within each of lines $64_{1-n}$ are switches $66_{1-n}$ that are shown in a closed configuration in FIG. 2A. For the purposes of discussion herein, sequential or arranged sequentially defines an arrangement in which the power modules $62_{1-n}$ are connected in an electrical circuit, e.g., end to end, such that terminals on the modules $62_{1-n}$ connect to terminals having a different polarity. Charging power sources $68_{1-n}$ are shown connected across each of the power modules $62_{1-n}$ via connector lines $70_{1-n}$, $72_{1-n}$ that provide electrical communication to the positive and negative terminals respectively of each of the power modules $62_{1-n}$. Optionally, recharging power sources $68_{1-n}$ are made up of a single power source (not shown) that connects to the power modules $62_{1-n}$ along connector lines $70_{1-n}$, $72_{1-n}$; optionally, the single power source is the power source 32. In the example of FIG. 2A, the switches $66_{1-n}$ being in the closed configuration is referred to as a standby mode. When in the standby mode and a loss of power or drop of power from power source 32 is sensed by controller 38, internal switching (not shown) provides electrical communication between ride-through module 40 and line 42, so that electricity flows from the modules $62_{1-n}$ in the ride-through module 40 to the ESP assembly 12 (FIG. 1) via line 42. Further in this example, the electrical energy stored in modules $62_{1-n}$ provides a threshold magnitude of electrical potential and current to motor 26 and causing motor 26 to exert a rotational torque to the shaft 27 and attached impellers 18. In an embodiment, the rotational torque is applied to the impellers 18 in the same rotational direction for lifting liquid by operation of the pump 17 ("pumping direction"), which is opposite to the rotational direction of the impellers 18 occurring during backspin ("backspin direction"), and the magnitude of the rotational torque is at least that of a rotational torque applied to the impellers 18 from a static head of liquid in and above the pump 17. Exerting a rotational torque against the impellers 18 in this direction and magnitude opposes and/or prevents backspin as the impellers 18 are either maintained in a rotationally stationary position or are rotated in the pumping direction. Further embodiments exist in which the rotational torque from the motor 26 while being energized by the ride through module 40, rotates the impellers 18 at a rate that prevents backflow.

Figure 2B:
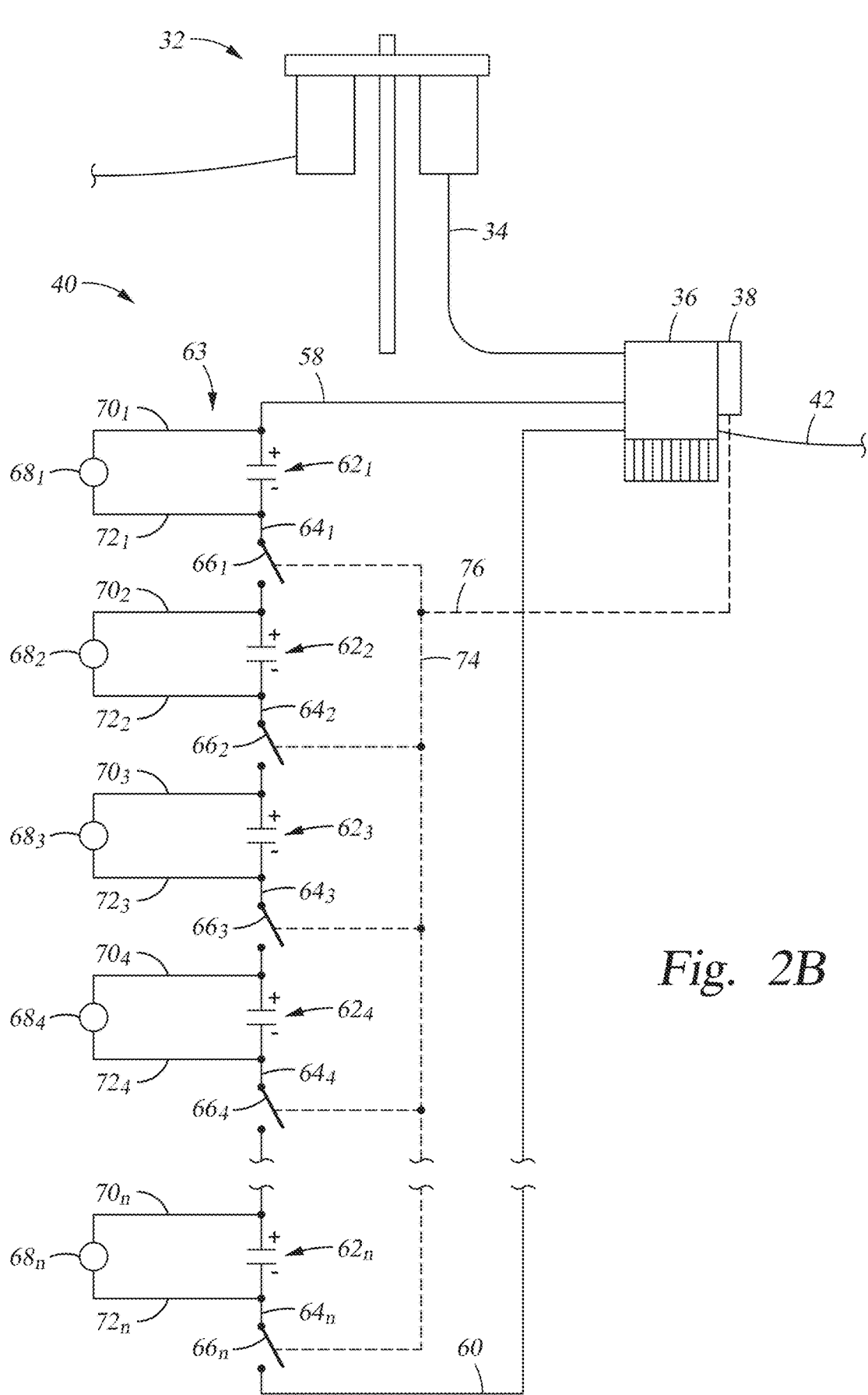
FIG. 2B is a schematic example of the ride through system of FIG. 2A in a deactivated mode.

Still referring to FIG. 2A, an interlock 74 is shown having legs coupled with each of the switches $66_{1-n}$, as described in more detail below interlock 74 provides a means for reconfiguring switches $66_{1-n}$ from the closed position shown in FIG. 2A and into an open configuration. Communication means 76, which in examples is wireless, hard-wired, or fiber optics, provides signal communication between controller 38 and interlock 74. Referring now to FIG. 2B, a schematic example of the ride-through system 40 is shown in a deactivated mode. In the deactivated mode the switches $66_{1-n}$ are in an open configuration so that each of the power modules $62_{1-n}$ are disconnected and electrically isolated from one another. In a non-limiting example, the switches $66_{1-n}$ are moved into the open position by operation of the interlock 74. In alternatives, the interlock 74 operates in response to receiving an activation signal from controller 38 via communication means 76. In the deactivated mode, and with sequential power modules $62_{1-n}$ electrically isolated from one another, the maximum electrical potential transmittable from the ride-through system 40 is no greater than the maximum electrical potential available from any one of the power modules $62_{1-n}$, that as across their respective positive and negative terminals. In examples, electricity that is transmittable is that which is conducted, or able to be conducted. In embodiments, the maximum electrical potential in any one of the power modules $62_{1-n}$ is at or below a threshold magnitude that is hazardous to personnel, which in one example is about 50 V. In examples when the ride-through module 40 is in the deactivated configuration, operations personnel freely handle the ride-through module 40 without personal protection equipment and without draining electrical energy from the power modules $62_{1-n}$.

In a non-limiting example of operation, electricity from power source 32 (FIG. 1) is received by variable speed drive 36, where it in combination with commands from controller 38, condition the electricity for use by motor 26 to power the pump 17 so that liquid inside well 14 is lifted to wellhead assembly 22. When the supply of electricity from power source 32 is interrupted, which in examples occurs for a period measured in milli-seconds to in excess of many minutes, ride-through system 40 of FIG. 2A is put into electrical communication with ESP assembly 12 for temporarily providing electricity to motor 26. Upon resumption of the supply of electricity from power source 32, ride-through system 40 is disconnected from ESP assembly 12 and one or more of power modules $62_{1-n}$ are recharged using recharging power source(s) $68_{1-n}$. While power modules $62_{1-n}$ have a substantially full charge, the interlock 74 is operated to reconfigure the ride-through system 40 from the standby mode of FIG. 2A to the deactivated mode shown in FIG. 2B. When in the deactivated mode, maintenance, service, repair, or replacement of all or a part of the ride-through system 40 is performed. Further in this example, upon completion of service, maintenance, or other handling by operations personnel of the ride-through module 40 when in the deactivated mode, a signal is generated from controller via communication means to interlock 74 to reconfigure. switches $66_{1-n}$ into the standby mode of FIG. 2A, which in a loss of power, as monitored through controller 38, motor 26 is optionally powered from electricity from the ride-through system 40. In alternatives, the interlock 74 moves switches $66_{1-n}$ between the open and closed position simultaneously, or at different times, such as in a particular sequence.

In embodiments, controller 38 includes a processor and a non-transitory computer-readable memory accessible by the processor and having executable code stored thereon. The executable code includes a set of instructions that causes a processor to perform operations that include operating the interlock 74, adjusting operation of the variable speed drive 36, and connecting rid-through system 40 with the ESP assembly 12. Examples of processor include a multicore processor with nodes such as those from Intel Corporation or Advanced Micro Devices (AMD), or an HPC Linux cluster computer. Process optionally is a mainframe computer of any conventional type of suitable processing capacity such as those available from International Business Machines (IBM) of Armonk, N.Y. or other source; or alternatively is a computer of any conventional type of suitable processing capacity, such as a personal computer, laptop computer, or any other suitable processing apparatus. It should thus be understood that a number of commercially available data processing systems and types of computers may be used for this purpose.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A ride through system for use with an electrical submersible pump ("ESP") assembly, the ride through system comprising:

a bank of power modules, each power module having an electrical potential connector lines that each have opposing ends connected between sequential power modules;

switches in each of the connectors lines that are changeable between an open position and a closed position, when the switches are in the closed position the power modules are arranged in series so that a maximum electrical potential transmissible from the bank of power modules is substantially equal to a sum of the electrical potentials of each of the power modules, and when in the open position the maximum electrical potential transmissible from the bank of power modules is equal to an electrical potential of a one of the power modules; and a controller configured to cause the switches to move between the open and closed positions and to provide electrical communication from the bank of power modules to the ESP.

2. The ride through system of claim 1, wherein when the switches are in the open position the ride through system is in a deactivated mode and when each switch is in a closed position the ride through system is in a standby mode.

3. The ride through system of claim 2, further comprising an interlock coupled to the switches, that selectively moves the switches between the open and closed positions, and wherein the interlock is in communication with the controller and is responsive to commands from the controller.

4. The ride through system of claim 1, wherein the maximum electrical potential from each of the power modules is 50 V and wherein the electrical potential from the bank of power modules to the ESP is 100 V.

5. The ride through system of claim 1, wherein the power modules are selected from the group consisting of a battery, a capacitor, a super capacitor, and combinations.

6. The ride through system of claim 1, wherein a variable speed drive for controlling electricity to the ESP assembly is in selective electrical communication with the bank of power modules.

7. The ride through system of claim 1, further comprising a recharging power source for recharging the power modules.

8. The ride through system of claim 7, wherein the recharging power source is the same as a power source for providing electrical power to the ESP assembly.

9. The ride through system of claim 1, wherein the magnitude of electrical potential in each of the power modules are at values selected from the group consisting of values that are substantially equal to one another, values that are different from one another, values that are substantially the same as others and different from others, and combinations.

10. The ride through system of claim 5, wherein the power modules are comprised of an arrangement of series and parallel configurations.

*     *     *     *     *